Feb. 10, 1970 H. S. WHITEHEAD 3,494,204
ACCELEROMETER PRODUCING A LINEAR ELECTRICAL OUTPUT
Filed May 2, 1966

INVENTOR
HAROLD S. WHITEHEAD

Richard E. Horley
BY
ATTORNEY

United States Patent Office 3,494,204
Patented Feb. 10, 1970

3,494,204
ACCELEROMETER PRODUCING A LINEAR
ELECTRICAL OUTPUT
Harold S. Whitehead, Marblehead, Mass., assignor to
General Electric Company, a corporation of New York
Filed May 2, 1966, Ser. No. 546,849
Int. Cl. G01p *15/08*
U.S. Cl. 73—517                        4 Claims

ABSTRACT OF THE DISCLOSURE

An accelerometer includes a D'Arsonval movement movement carrying an acceleration sensitive mass and a light shutter, coupled to a Wheatstone bridge circuit, in a closed loop torque system. The light shutter via a photocell and an amplifier varies the impedance of one input side-arm of the bridge and thus, the current through the output cross-arm of the bridge. The movement is in parallel with the cross-arm and wound to oppose torque changes in the shutter.

---

This invention is generally directed to accelerometers. More specifically it is directed to accelerometers which provide an electrical signal output which varies linearly with acceleration.

Accelerometers which provide an electrical output signal have been used in the prior art, but generally these devices have not been capable of providing a linear output over a wide range of accelerations, such as 10,000 to 1. Furthermore, those accelerometers which have been used in the prior art have been subject to mechanical instability and/or complex electrical circuitry which have resulted in reliability and accuracy limitations.

Therefore, it is an object of this invention to provide an accelerometer capable of producing a linear electrical output signal over a wide range of accelerations.

Basically, an accelerometer constructed in accordance with this invention produces an electrical output signal which varies linearly with acceleration by utilizing an energy sensitive device energized at a level determined by the acceleration. Changes in energy level caused by acceleration are converted to appear as a variable impedance in one leg of a stable Wheatstone bridge to unbalance the bridge and thereby produce an electrical output across an output circuit. This output controls means for energizing a torquing means for producing a force on a coupling means which controls the energy level and which is equal and opposite to the force caused by acceleration.

Figure 1:
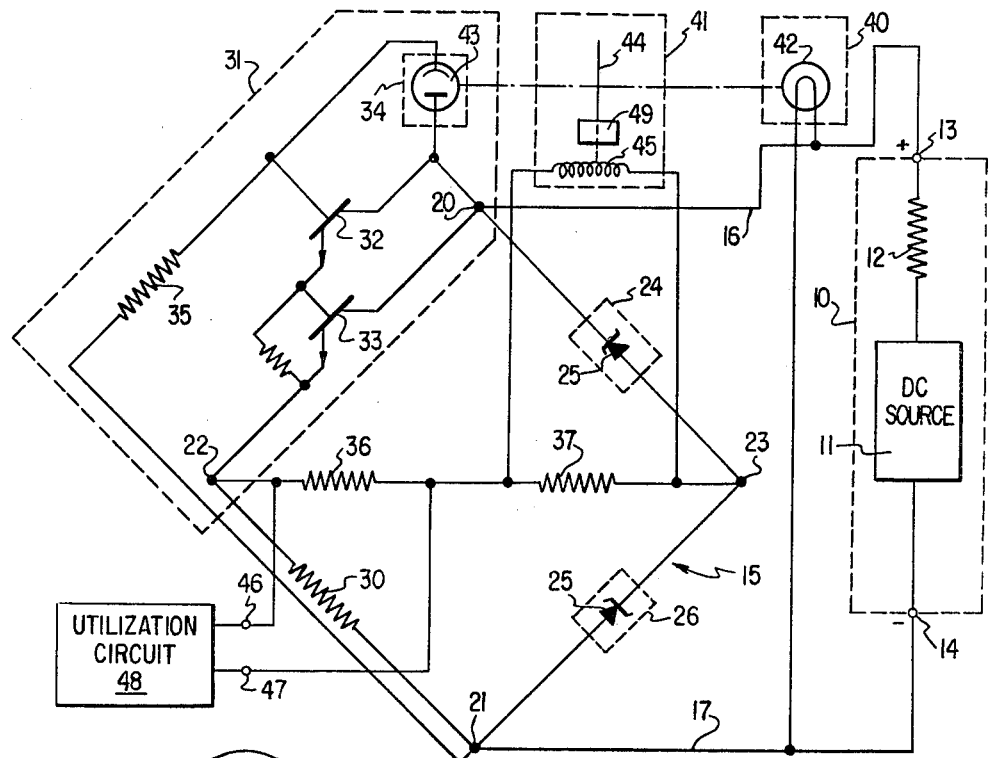
Figure 2:
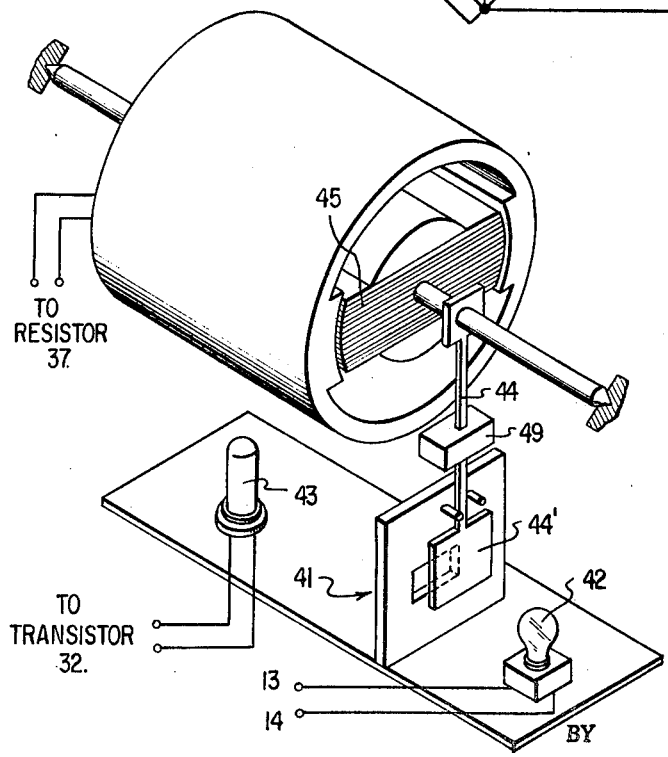

This invention has been pointed out with particularity in the appended claims. A more thorough understanding of the above and additional objects and advantages of this invention can be obtained by reference to the subsequent description taken in conjunction with the accompanying drawings wherein:

FIGURE 1 schematically illustrates an accelerometer utilizing the invention; and FIGURE 2 illustrates an energy sensitive device which can be used in the invention.

An accelerometer constructed in accordance with this invention is generally energized by a power supply 10 constituted by a direct current source 11 and a ballast resistor 12 connected in series to input terminals shown as a positive input terminal 13 and a negative input terminal 14.

Input terminals 13 and 14 are coupled to a Wheatstone bridge 15 by means of conductors 16 and 17 connected to bridge input terminals 20 and 21. Wheatstone bridge 15 includes output terminals 22 and 23. A first load means 24 such as a zener diode 25 is connected from output terminal 23 to input terminal 20 while a second load means 26, similarly constituted by a zener diode 27, is connected from input terminal 21 to output terminal 23. Both load means 24 and 26 are preferably chosen to produce constant voltage drops when energized by power supply 10 notwithstanding changes in the potential of source 11 to thereby stabilize the power supply and provide better calibration as will be made more evident hereinafter. If accurate calibration is not required, then resistors could be used as load means.

A first resistor 30 is connected between input terminal 21 and output terminal 22 and a variable impedance means 31 completes the bridge by being connected between input terminal 20 and output terminal 22. Variable impedance means 31 is constituted by a typical high-gain DC amplifier which includes transistors 32 and 33. The output of the amplifier is connected between input terminal 20 and output terminal 22 to act as a variable impedance in the bridge circuit 15. Input control of the amplifier is provided by an energy sensitive device 34 which is connected in a voltage divider network with a resistor 35 across power supply 10. A junction formed between these components is coupled to the amplifier input.

Variations in supply voltage or in circuit parameters during operation of the accelerometer are of such a minor magnitude in relation to the gain of the amplifier that they are effectively swamped out so that the bridge output is effectively determined by the input to the high-gain amplifier only.

Bridge unbalance is converted to a suable to a usable output signal by means of a resistor 36 connected in series with a resistor 37. Both of these resistors are connected in series between output terminals 22 and 23. In order that the output of the circuit be linear, resistors 36 and 37 are preferably precision resistors.

Control of the high-gain amplifier is provided by controlling the energy level which strikes the energy sensitive device 34. Energy, produced by a source 40, is directed through a variable coupling means 41 to the energy sensitive device 34. The exact nature of the source, coupling means and energy sensitive device are dependant upon the nature of the energy which it is desired to use. Many types of energy can be effectively used in an accelerometer described herein. As an example, nuclear energy, radiant energy, heat energy or light energy could be used. For purposes of explanation it is assumed that light energy is used so that the energy source 40 is constituted by a lamp 42 which is connected across the power supply 10. In the particular embodiment shown in FIGURES 1 and 2, the lamp 42 is connected between the positive power supply terminal 13 and the negative power supply terminal 14. By utilizing this configuration, lamp 42 is placed in parallel with the constant voltage means 14 and 26 so that it is energized at a constant level. Any other arrangement of producing light such as connecting a lamp directly across the power supply terminals or by energizing a lamp by another, separate source could also be used. Light from lamp 42 is then directed through variable coupling means 41 to the energy sensitive device 34 which is constituted by a photocell 43.

Similarly, variable coupling means 41 can be constituted by many devices known in the art; however, it has been found preferable to use a direct current meter with a meter employing a d'Arsonval movement being particularly adapted because of its frictionless characteristic. A jeweled meter movement is shown schematically in a perspective view in FIGURE 2; other variations of meter movements, such as a taut-band suspension movement are also adaptable. The pointer 44 of the d'Arsonval movement meter is modified to act as an energy gate in the form of a shutter 44'. Therefore, movement of the pointer 44 causes a variation in the magnitude or intensity of the light striking photocell 43. Another desirable feature of the d'Arsonval meter should be a negligible restoring torque as will be more fully appreciated hereinafter. In addition to the pointer 44 the d'Arsonval meter movement also includes a coil 45 which is connected across the resistor 37. Coil 45 is wound and connected across resistor 37 so that a change in the light striking photocell 43 causes torque to be exerted on pointer 44 which tends to overcome the light level change.

Finally, the circuit is completed by providing output terminals 46 and 47 which are coupled across resistor 36 and which are shown as being connected to a utilization circuit 48.

This accelerometer, as shown, operates to provide indications of the magnitude and direction of acceleration. In operation, the accelerometer is initially calibrated at zero acceleration so that the bridge has no output; that is, there is no current through resistors 36 and 37 or variable coupling means 41. A suitable mass shown diagrammatically at 49 is mounted on the pointer 44 to provide a deflection force when an acceleration is present. This deflection force will be directly proportional to the acceleration. If the accelerometer is subjected to such an acceleration, pointer 44 moves from its zero acceleration point due to the deflection force and because there is negligible restoring torque acting on the pointer 44 and varies the energy striking the photocell 43 to thereby change its impedance. This change in impedance is transformed by the amplifier so that the impedance of the leg of the Wheatstone bridge 15 between input terminal 20 and output terminal 22 is also varied. Bridge circuit 15 is thereby unbalanced and a current flows through the leg constituted by resistors 36 and 37 and variable coupling means 41 from output terminal 22 to output terminal 23 depending on the impedance shift which is produced by the output of the high-gain amplifier. This current energizes coil 45 to produce a torque in the direct current meter which is converted to a force acting on pointer 44 equal to but opposite in direction to the force exerted on pointer 44 and the mass 49 by the acceleration. Therefore, the torques are balanced and an output appears at the output terminals 46 and 47 which is linearly proportional to the magnitude of the acceleration and which appears at the terminals 46 and 47 for so long as the acceleration persists. The system is a closed loop torque device. The amplifier gain is made high enough to make the loop gain adequately high to render insignificant all variables, including any striction or secondary torque errors, except acceleration. Thus, the torque produced by the acceleration is always equal and opposite to magnetic torque produced by the instrument movement, and this magnetic torque is a linear function of the current through the movement, and this current produces the output signal by generating an IR drop across the fixed output resistor.

If there is a decrease in the magnitude of acceleration, then the restoring torque caused by coil 45 tends to return the energy gate 44 toward the zero acceleration point. However, as the pointer 44 moves, the energy striking photocell 43 is again varied thereby causing a change in the unbalance in the bridge 15 until the acceleration and the restoring torque forces are equated again.

By using two constant voltage load means 24 and 26, two desirable advantages are obtained. First, as the bridge circuit power supply is stabilized, the calibration of the accelerometer remains substantially constant under varying operating conditions. Further, by making both constant voltage load means equal, the accelerometer is equally sensitive to both acceleration and deceleration. If it were only necessary to measure accelerations in one direction, then the second constant voltage means 26 could be replaced by a pair of forwardly biased diodes or other constant voltage means of low value so that a small voltage drop would appear across that leg without a loss in the stability or performance.

As will be obvious to those skilled in the art, any type of a meter can be used as the variable coupling means 41 when a light source 42 is used. Further, the mass 49 on the pointer 44 can be mounted non-pendulously to sense angular acceleration applied to the device about the axis of rotation of the energy gate or linear acceleration if the mass 49 is pendulous about its axis of rotation. By varying the damping, inertia, spring constant and torque gradient characteristics of the meter, a wide variety of jerk, acceleration, velocity and position measurements are possible by additionally incorporating a utilization circuit 48 such as an integrating circuit, a differentiating circuit or other desirable output circuit. Further, if a current output is required, resistor 36 can be eliminated and the current sensing means inserted in series with resistor 37. Additionally, resistor 37 can also be eliminated so that, under proper circumstances, coil 45 in series with the current sensing means replacing resistor 36.

While many modifications have been pointed out herein it will be obvious to those of ordinary skill in the art that additional modifications can be made to the circuit shown herein without departing from the true spirit and scope of this invention. Basically, this invention is directed to a simple and accurate accelerometer of wide range capable of producing an output signal which varies linearly with acceleration. It comprises, basically, a Wheatstone bridge circuit utilizing a constant voltage load means to stabilize a voltage from a power supply applied to the bridge and a high-gain amplifier which causes the bridge to unbalance. The high-gain amplifier is energized by an energy sensitive device which controls the effective output resistance of the amplifier. The energy sensitive device is energized by varying energy levels which are controlled by a variable coupling means which is responsive to acceleration of the accelerometer. Subjection of the accelerometer to acceleration causes the variable coupling means to vary the energy reaching the energy sensitive device to thereby cause the bridge to unbalance until the current through a restoring torque coil of the variable coupling device causes the energy gate to reach a balanced torque condition. The current required to produce the balanced torque condition is proportional to the acceleration to which the accelerometer has been subjected.

What is claimed as new and desired to be secured by Letters Patent of the United States is:

1. An accelerometer for providing an output signal responsive to received acceleration, comprising:
   a Wheatstone bridge;
   first and second accelerometer input power terminals;
   an input control means; and
   first and second accelerometer output signal terminals;
   said bridge including:
       first and second bridge input terminals respectively coupled to said first and second accelerometer input power terminals;
       first and second bridge output terminals;
       first constant voltage drop means coupled between said first bridge input terminal and said second bridge output terminal;
       second constant voltage drop means coupled between said second bridge output terminal and said second bridge input terminal;
       first variable impedance means coupled between said first bridge input terminal and said first bridge output terminal, and having a control terminal,
       first constant impedance means coupled between said first bridge output terminal and said second bridge input terminal;
       second and third constant impedance means in series coupled between said first and second bridge output terminals;

said input control means including:
  second energy responsive variable impedance means coupled between said first bridge input terminal and said first variable impedance means control terminal;
  fourth constant impedance means coupled between said first variable impedance means control terminal and said second bridge input terminal, energy source means, and
  a meter movement having a coil and a shutter fixed to a common shaft, said coil being coupled across said third constant impedance means, said shutter being normally interposed between said energy source means and said second energy responsive variable impedance means for limiting the energy flow therebetween;
said first and second accelerometer input power terminals being adapted to receive a DC source therebetween,
said first and second accelerometer output signal terminals being coupled across said second constant impedance means and adapted for coupling to a utilization means,
whereby upon said accelerometer being accelerated, said shaft is incrementally rotated responsively to shift said shutter to vary the energy flow to said second energy responsive variable impedance means to unbalance said bridge to provide a current flow between said first and second bridge output terminals and through said coil to cause said coil to tend to torque in a direction opposite to the direction of rotation of the shaft caused by the acceleration and to provide an IR drop between said first and second accelerometer output signal terminals responsive to the acceleration.

2. An accelerometer according to claim 1 wherein said first and second constant voltage loop means comprise Zener diodes.

3. An accelerometer according to claim 2 wherein said first variable impedance means comprises a high gain amplifier whose control bias is determined by a potential divider comprising said second energy responsive variable impedance means and said fourth constant impedance means.

4. An accelerometer according to claim 3 wherein said second energy responsive variable impedance means is a diode photo cell.

References Cited

UNITED STATES PATENTS

| | | | |
|---|---|---|---|
| 2,498,997 | 2/1950 | McLean | 73—518 |
| 2,696,739 | 12/1954 | Endres | 73—362 |
| 2,995,935 | 8/1961 | Eyestone | 73—517 |
| 3,247,723 | 4/1966 | Yavne | 73—516 |
| 3,250,991 | 5/1966 | Beeston | 324—62 |
| 3,295,378 | 1/1967 | Hirtreiter | 73—517 |

OTHER REFERENCES

Cattermore, K. W.; Transistor Circuits, New York, MacMillan Co., 1959, p. 106.

JAMES J. GILLS, Primary Examiner

H. GOLDSTEIN, Assistant Examiner

U.S. Cl. X.R.

323—75